Dec. 20, 1949    W. E. LEIBING ET AL    2,491,820
FLEXIBLE DRIVE
Filed Sept. 17, 1945    2 Sheets-Sheet 1
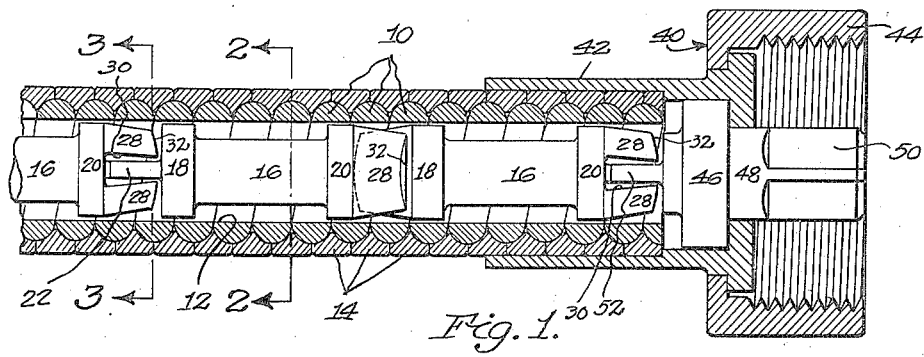
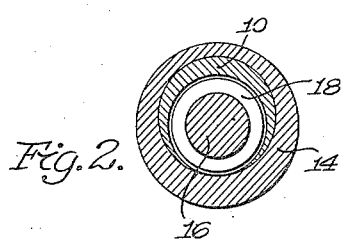
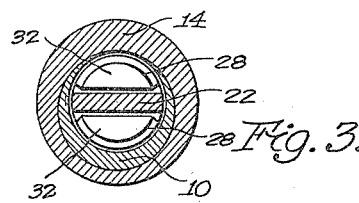
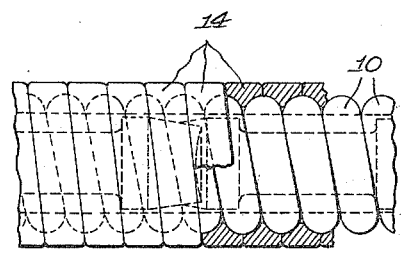
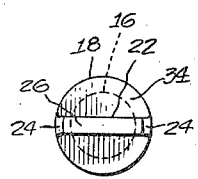
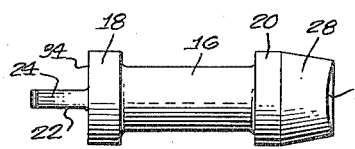
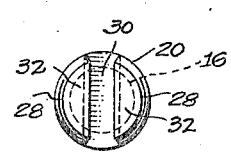
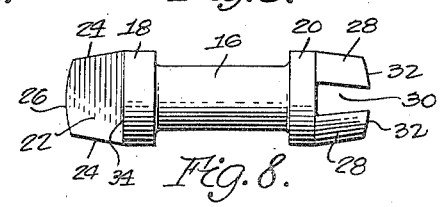
INVENTORS
William E. Leibing
BY Robley D. Fageol
A. R. McCrady
ATTY Dec. 20, 1949     W. E. LEIBING ET AL     2,491,820
FLEXIBLE DRIVE Filed Sept. 17, 1945     2 Sheets-Sheet 2

INVENTOR.
William E. Leibing
BY Robley D. Fageol
Att'y

Patented Dec. 20, 1949

2,491,820

UNITED STATES PATENT OFFICE 2,491,820

FLEXIBLE DRIVE

William E. Leibing and Robley D. Fageol, Detroit, Mich., assignors, by mesne assignments, to R. D. Fageol Co., Detroit, Mich., a corporation of Michigan Application September 17, 1945, Serial No. 616,888

3 Claims. (Cl. 64—2)

This invention relates to a flexible drive, and more particularly to drive means wherein a series of links, articulated with respect to each other, are rotatably mounted within a flexible housing.

An object of the invention is to provide a flexible drive having improved operating characteristics and minimum torsional deflection.

A further object of the invention is to provide a flexible drive suitable for actuating the governor of an internal combustion engine, and adapted to drive the governor in consonance with the speed of the engine, without fluctuations such as would be due to torsional deflection of the shaft due to sudden acceleration and deceleration of the engine.

A further object of the invention is to provide a flexible drive wherein the torque transmitting means is made up of a series of rigid elements connected to each other by universal couplings.

A further object of the invention is to provide a flexible drive shaft having high torsional strength to enable it to transmit without failure the high torques resulting from acceleration of the engine and inertia of the rotating elements of the governor.

A further object of the invention is to provide an improved flexible drive having low internal friction, and capable of being lubricated to maintain such friction at a minimum value.

Further objects and advantages of the invention will be apparent from the following description, taken in connection with the appended drawings, in which:

Fig. 1 is a longitudinal section through a drive embodying the present invention;

Fig. 2 is a transverse section taken on the line 2—2 of Fig. 1;

Fig. 3 is another transverse section, taken on the line 3—3 of Fig. 1;

Fig. 4 is a lateral elevation of the housing, with parts broken away to reveal the interior construction;

Fig. 5 is a lateral view of one of the driving elements;

Fig. 6 is an end view of the same;

Fig. 7 is another end view of the same, taken in the opposite direction from Fig. 6;

Fig. 8 is another lateral view of one of the driving elements taken at right angles to the view shown in Fig. 5.

Figure 9:
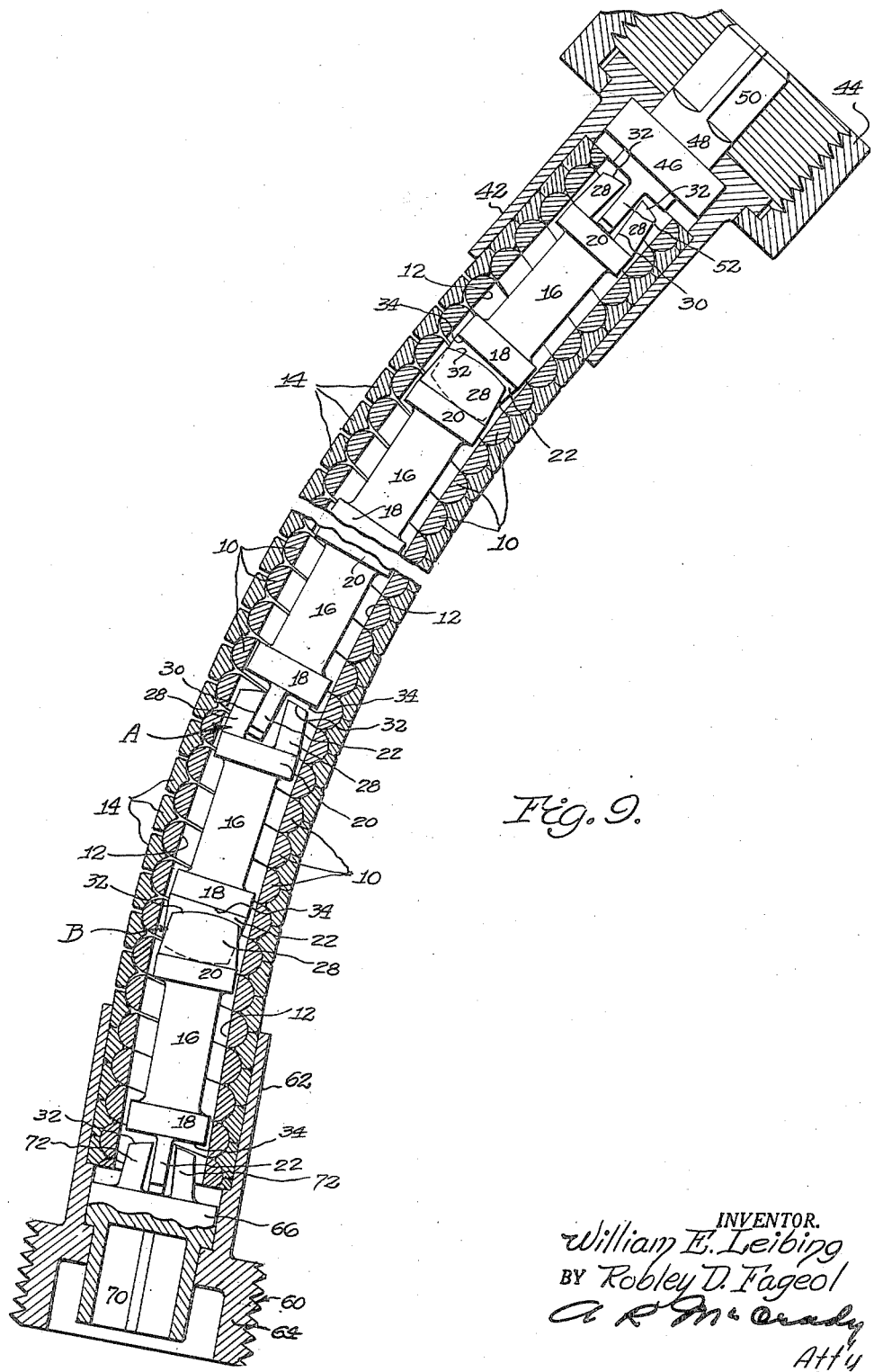
Fig. 9 is a longitudinal section showing the drive shaft in curved or bent shape.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The flexible drive shown in the drawing comprises a housing formed of coiled spring wire 10, coiled upon itself with such residual tension that when bent into curved shape it tends to restore itself to the straight form shown in Fig. 1. The wire 10 is of semi-circular shape in cross section, with the flat sides disposed inwardly to form a cylindrical bore 12 which houses the rotary driving elements. Exteriorly of the wire 10 is an external layer or sheath formed of a wire 14, so shaped in cross sectional contour as to fit snugly against the wire 10 to fill the interstices between successive coils of the same, to prevent entry of foreign matter into the bore 12, and to prevent leakage of lubricant in the reverse direction. The wire 14 is of non-elastic malleable metal, and may be preformed to the cross sectional shape shown, or may be formed to such shape by compression after it has been overlaid upon the wire 12, in the manner known in the art. As shown in Fig. 9, when the housing is bent into curved form, adjacent coils of the wires 10 and 14 at the outside of the curve will separate from each other. The diameter of the housing will however remain approximately the same, and the coils of the wire 14 on the outside of the curve will remain in contact with the coils of the wire 10, so as to maintain the housing in sealed condition against leakage of lubricant or entry of foreign matter. The friction developed in this action resists the restoring resilient force of the wire 10, so that the housing will remain in whatever shape, within its designed limits, it is moved into. If hermetic sealing of the housing is desired, the same may be provided with an outer covering of rubber or like material, in the known manner.

Within the flexible housing is a rotatable torque transmitting member or drive shaft, formed of discrete but identical links, each of which is formed with a shank 16, and cylindrical bearing members 18 and 20 at opposite ends of the shank adapted to bear against the cylindrical wall of the base 12, which forms a journal therefor, but with sufficient clearance to allow for a certain amount of distortion of the housing due to bending or other causes. Extending longitudinally from each of the bearing members 18 is a tongue 22, having its lateral surfaces 24 (Fig.

8) tapered as shown so that when the drive shaft and housing are bent to the maximum permissible extent the lateral surfaces will lie substantially parallel to the inner surface of the bore 12, and will not tend to gouge into the same. The end surface 26 of the tongue 22 is of arcuate form, lying in a cylinder having as its axis a line passing through the center of shank 16 perpendicular to the plane of the paper in Fig. 3, so that when one of the links is rotated relative to its adjacent link about an axis normal to the axis of the links, as they will be when the drive shaft is bent, the distance from center to center of the two links, measured along the axis of the drive shaft, will remain substantially the same, and the total length of the drive shaft will remain the same, except for such slight separation between the ends of adjacent links as may be caused by the flexing of the housing.

Extending from the bearing member 20 of each of the links are a pair of jaws 28 separated by a slot 30 designed to receive the tongue 22 of the adjacent link to form therewith a universal coupling. The outer surfaces of the jaws 28 are of frusto-conical form, being inclined to the axis of the link by the same angle as are the surfaces 24 of the tongue, and for the same reason. The inner surfaces of the slot 30 are likewise flared inwardly by the same angle as the angle of taper of surfaces 24, so that when two adjacent links are rotated relative to each other as will occur when the drive is bent to the minimum radius of curvature permitted by the construction of the housing, one of the flat surfaces of the tongue will lie in contact with one of the surfaces of the slot, as shown in the coupling designated coupling A in Fig. 9. On the other hand, when two adjacent links are rotated relative to each other to the position shown in the coupling designated coupling B in Fig. 9, the tongue 22 will simply roll or rock upon its curved end surface 26, but will remain equally spaced from the two inner surfaces of the slot.

The end surfaces 32 of the jaws 28, as viewed in Fig. 5, are normal to the axis of the link, but as will be seen in Fig. 8 are of cylindrical shape, and lie in a cylinder having as its axis a line passing through the center of shank 16 perpendicular to the plane of the paper, which cylinder as above noted also includes the end surface 26 of the tongue. The effect of this arrangement is to permit adjacent links to rotate relative to each other without interference between the surfaces 32 and the opposed surface 34 of the adjacent bearing member 18. Preferably the jaws 28 are made slightly shorter than the tongue 22, so that there will at all times be a slight clearance between the surfaces 32 and 34.

The links of the drive shaft are preferably formed of tool steel or the like, so as to enable them to withstand, without material torsional deformation and with a minimum of wear, the torque to which they are subjected. Some degree of play or backlash exists between the tongues and the jaws, but it is less than that commonly found in shafts made of spring wire, and its effect is not accentuated by the resiliency which is characteristic of the spring wire shaft. When the instant device is connected to the governor of an internal combustion engine, therefore, the governor is driven in approximate consonance with the speed of the engine.

In the end of the housing is provided an end fitting 40, made up of a stationary collar member 42 which encloses the end of the housing, and a female coupling member 44, internally bored to receive a threaded nipple, in the known manner. The elements 42 and 44 are secured together in non-rotative relation by means of interengaging flanges as shown. The collar 42 is formed with a cylindrical bore which forms a journal for a cylindrical bearing member 46, which is provided with a stub shaft 48 having a non-circular end 50 designed to engage a driving member of complementary form, which may be actuated by the engine camshaft in the known manner. At its opposite face, the bearing member 46 is provided with a projection having formed thereon a tongue 52, similar in all respects to the tongues 22 above described, and adapted to engage the slot 30 of one of the drive shaft links.

At the opposite end of the housing is an end fitting 60, made up of a collar member 62 which encloses the end of a housing, and a male coupling member 64, internally bored to engage a cooperating fitting on the engine governor. The collar 62 is formed with a cylindrical bore which forms a journal for a cylindrical bearing member 66, which is provided with a non-circular end socket 70 designed to engage a driven member of complementary form, which may be the shaft of a centrifugal governor mounted on the automobile engine. At its opposite face, the bearing member 66 is provided with a projection formed with jaws 72, similar to the jaws 28 above described and adapted to receive a tongue 22 of one of the drive shaft links. The governor driven by the instant device may be of the type disclosed in the copending application of Robley D. Fageol, Serial No. 590,772, filed April 28, 1945, now abandoned.

In operation, the tongues 22 and jaws 28 act as universal couplings, permitting a limited degree of bending of the shaft, and also a limited degree of misalinement independently of bending, in the latter respect acting in somewhat the manner of an Oldham coupling. The bearing members 18 and 20 are in effect journaled in the cylindrical inner surfaces of the coils of wire 10 and with the shaft lubricated as above indicated develop little friction. With the shaft bent as indicated in Fig. 9, each coupling in its rotation passes from the position indicated in coupling A to the position indicated in coupling B and thence through its cycle, the tongue 22 rocking or rolling upon the end surface of the slot 30 while simultaneously sliding crosswise thereof, but not under pressure, since no compression is exerted lengthwise of the shaft. The driving elements being rigid, the torsional deflection is very low.

In the assembly of the drive, the links of the drive shaft are dropped into the bore 12 with all the male ends of the links disposed in the same direction. By manually rotating the last link, the tongues and jaws may be caused to register and to engage each other in the manner shown in Figs. 1 and 9, the tongue 22 of the first link engaging between jaws 72 of the female bearing member 66. When the links are in place, lubricant is introduced into the housing, and bearing member 46 and fitting 40 are secured to the other end of the housing to seal the same. The length of the sheath is of course calculated to correspond to the combined lengths of a predetermined number of links.

Although the invention has been described with particular reference to a specific embodiment thereof, it may be embodied in other forms, within the skill of artisans in this art. The in-

We claim:

1. A flexible drive comprising a series of links, each link comprising longitudinally spaced cylindrical bearing members, a shank connecting said bearing members, tapered jaws extending outwardly from one of said cylindrical members and forming an inwardly flared slot, a tapered tongue extending from the other of said bearing members and adapted to seat in a similar slot, the outer end surfaces of said jaws and tongue lying in a cylinder described with a line passing transversely through the center of the link as its axis.

2. A flexible drive comprising a plurality of links connected end-to-end by universal couplings, each of said couplings being formed by a pair of jaws on one link forming an inwardly flared slot therebetween and a tongue on the adjacent link seated in said slot with its outer edge in rolling engagement with the base of the slot, said base being substantially plane, the outer surfaces of the jaws and tongue of each link lying in a common cylindrical surface.

3. A link for a flexible drive shaft comprising spaced cylindrical bearing members, a shank connecting said bearing members, a pair of jaws extending outwardly from one of said bearing members and forming an inwardly flared slot therebetween, the lateral surfaces of said jaws being of frusto-conical form, a tongue extending outwardly from the other of said bearing members and shaped to engage a similar slot in universal relation, the outer surfaces of said jaws and said tongue lying in a common cylindrical surface.

WILLIAM E. LEIBING.
ROBLEY D. FAGEOL.

REFERENCES CITED

The following references are of record in the file of this patent:

UNITED STATES PATENTS

| Number  | Name      | Date          |
|---------|-----------|---------------|
| 776,977 | Wicksteed | Dec. 6, 1904  |
| 815,240 | Warner    | Mar. 13, 1906 |

FOREIGN PATENTS

| Number | Country       | Date |
|--------|---------------|------|
| 19,017 | Great Britain | 1900 |